US012488723B2

(12) United States Patent
Jeong et al.

(10) Patent No.: US 12,488,723 B2
(45) Date of Patent: Dec. 2, 2025

(54) DISPLAY DEVICE AND A METHOD OF DRIVING THE DISPLAY DEVICE

(71) Applicant: SAMSUNG DISPLAY CO., LTD., Yongin-si (KR)

(72) Inventors: Ji-Woong Jeong, Yongin-si (KR); Boyoung An, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/367,561

(22) Filed: Sep. 13, 2023

(65) Prior Publication Data

US 2024/0153429 A1 May 9, 2024

(30) Foreign Application Priority Data

Nov. 4, 2022 (KR) ........................ 10-2022-0145901

(51) Int. Cl.
*G09G 3/32* (2016.01)
*G09G 3/20* (2006.01)

(52) U.S. Cl.
CPC ............. *G09G 3/2018* (2013.01); *G09G 3/32* (2013.01); *G09G 2310/0208* (2013.01); *G09G 2310/027* (2013.01); *G09G 2320/0666* (2013.01)

(58) Field of Classification Search
CPC ................... G09G 3/2018; G09G 3/32; G09G 2310/0208; G09G 2310/027; G09G 2320/0666; G09G 2300/0842; G09G 3/3275; G09G 2310/0262; G09G 2310/066; G09G 2320/0233; G09G 2320/0285; G09G 2320/0295; G09G 2320/041; G09G 2330/021; G09G 2360/16; G09G 3/3233; G09G 3/3266; G09G 2320/043
See application file for complete search history.

(56) References Cited

U.S. PATENT DOCUMENTS

| | | | | |
|---|---|---|---|---|
| 10,755,635 | B2 | 8/2020 | Yang et al. | |
| 11,721,271 | B2 * | 8/2023 | Jeong | G09G 3/2092 345/55 |
| 12,039,910 | B2 * | 7/2024 | Park | G09G 3/2074 |

(Continued)

FOREIGN PATENT DOCUMENTS

| | | |
|---|---|---|
| CN | 116013179 | 4/2023 |
| KR | 10-2016-0078749 | 7/2016 |

(Continued)

*Primary Examiner* — Temesghen Ghebretinsae
*Assistant Examiner* — Karin Kiyabu
(74) *Attorney, Agent, or Firm* — F. CHAU & ASSOCIATES, LLC

(57) ABSTRACT

A display device including: a display panel which includes a plurality of pixels arranged in first to $n^{th}$ pixel rows, wherein n is a natural number greater than 1; and a panel driver which drives the display panel in response to input image data, and generates sensing data by sensing the plurality of pixels, wherein the panel driver randomly senses one of the first to $n^{th}$ pixel rows in each of a plurality of sensing frame periods when the input image data correspond to a low grayscale image, wherein the sensing frame periods are repeated and consecutive non-sensing frame periods are provided between the sensing frame periods.

21 Claims, 14 Drawing Sheets

(56) References Cited

U.S. PATENT DOCUMENTS

| | | | | |
|---|---|---|---|---|
| 2015/0130866 | A1* | 5/2015 | Bae | G09G 3/3225 345/694 |
| 2015/0187267 | A1* | 7/2015 | Park | G09G 3/3233 345/77 |
| 2015/0187268 | A1* | 7/2015 | Tani | G09G 3/3233 345/77 |
| 2016/0078813 | A1* | 3/2016 | Mizukoshi | G09G 3/3233 438/23 |
| 2016/0351160 | A1* | 12/2016 | In | G09G 3/3225 |
| 2017/0061877 | A1* | 3/2017 | Lee | G09G 3/3233 |
| 2017/0193918 | A1* | 7/2017 | Bae | G09G 3/3291 |
| 2018/0053462 | A1* | 2/2018 | Bae | G09G 3/2074 |
| 2018/0137825 | A1* | 5/2018 | An | G09G 3/3291 |
| 2020/0074938 | A1* | 3/2020 | Kim | G09G 3/3233 |
| 2020/0202787 | A1* | 6/2020 | Do | G09G 3/2007 |
| 2020/0312235 | A1* | 10/2020 | Kim | G09G 3/3275 |

FOREIGN PATENT DOCUMENTS

| | | | | |
|---|---|---|---|---|
| KR | 20170072119 | A * | 6/2017 | |
| KR | 20190011974 | A * | 2/2019 | G09G 3/3233 |
| KR | 10-2020-0134584 | | 12/2020 | |
| KR | 10-2023-0058234 | | 5/2023 | |

* cited by examiner

FIG. 10

| SECTION | START GRAYSCALE | END GRAYSCALE | NUMBER OF PIXELS |
|---|---|---|---|
| H15 | 240 | 255 | 4,147,200 |
| H14 | 192 | 239 | - |
| H13 | 160 | 191 | - |
| H12 | 128 | 159 | - |
| H11 | 112 | 127 | - |
| H10 | 96 | 111 | - |
| H09 | 80 | 95 | - |
| H08 | 64 | 79 | - |
| H07 | 48 | 63 | - |
| H06 | 40 | 47 | - |
| H05 | 32 | 39 | - |
| H04 | 24 | 31 | - |
| H03 | 16 | 23 | - |
| H02 | 9 | 15 | 4,147,200 |
| H01 | 1 | 8 | - |
| H00 | 0 | 0 | - |

RG:15G

DISPLAY DEVICE AND A METHOD OF DRIVING THE DISPLAY DEVICE

CROSS-REFERENCE TO RELATED APPLICATION(S)

This application claims priority under 35 U.S.C. § 119 to Korean Patent Application No. 10-2022-0145901 filed on Nov. 4, 2022 in the Korean Intellectual Property Office (KIPO), the disclosure of which is incorporated by reference herein in its entirety.

1. TECHNICAL FIELD

Embodiments of the present disclosure relate to a display device. More particularly, embodiments relate to a display device that can be utilized in a range of electronic apparatuses, as well as a method of driving the display device.

2. DESCRIPTION OF THE RELATED ART

A display device typically consists of a display panel and a panel driver. The display panel may include a plurality of pixels, and the panel driver may drive the display panel in response to input image data. The display device may display an image through light emitted from the pixels.

Each pixel within the display panel may include a plurality of transistors, which consist of a driving transistor and a light emitting diode. The driving transistor generates a driving current, which causes the light emitting diode to emit light in proportion to the driving current. Due to process deviations or degradation of the pixels, there may by a deviation in characteristics (such as a threshold voltage or mobility of a driving transistor) between pixels. The deviation in characteristics between the pixels may lead to discrepancies in the brightness of an image displayed on the display device, potentially resulting in a decline in display quality.

To compensate for any deviation in characteristics between the pixels, the panel driver can perform sensing operation on the pixels. By using the sensing voltages and currents of the pixels, the panel driver may calculate the threshold voltages and mobilities of the driving transistors. The panel driver may use this information to adjust the input image data and compensate for the deviation in characteristics between the pixels.

SUMMARY

Embodiments of the present disclosure provide a display device having improved display quality and a method of driving the display device.

A display device according to an embodiment of the present disclosure includes: a display panel which includes a plurality of pixels arranged in first to $n^{th}$ pixel rows, wherein n is a natural number greater than 1; and a panel driver which drives the display panel in response to input image data, and generates sensing data by sensing the plurality of pixels, wherein the panel driver randomly senses one of the first to $n^{th}$ pixel rows in each of a plurality of sensing frame periods when the input image data correspond to a low grayscale image, wherein the sensing frame periods are repeated and consecutive non-sensing frame periods are provided between the sensing frame periods.

The panel driver does not sense the first to $n^{th}$ pixel rows in the non-sensing frame periods.

The panel driver includes: a scan driver which provides scan signals to the plurality of pixels; a data driver which provides data voltages to the plurality of pixels, and receives sensing voltages from the plurality of pixels; and a timing controller which controls a driving of the scan driver and a driving of the data driver.

Each of the plurality of pixels includes: a first transistor connected between a first power line and a second node, wherein the first transistor has a gate electrode connected to a first node; a second transistor connected between a data line and the first node, wherein the second transistor has a gate electrode connected to a first scan line; a third transistor connected between a reference line and the second node, wherein the third transistor has a gate electrode connected to a second scan line; a storage capacitor connected between the first node and the second node; and a light emitting diode connected between the second node and a second power line.

The timing controller controls the driving of the data driver such that the first to $n^{th}$ pixel rows are not sensed in the non-sensing frame periods.

The timing controller controls the driving of the scan driver such that the first to $n^{th}$ pixel rows are not sensed in the non-sensing frame periods.

A scan signal for turning-off the second transistor is provided to the gate electrode of the second transistor of each of the plurality of pixels in a vertical blank period of each of the non-sensing frame periods.

The timing controller includes: a low grayscale determiner which determines whether the input image data correspond to the low grayscale image; a sensing method determiner which determines a sensing method of the first to $n^{th}$ pixel rows according to whether the input image data correspond to the low grayscale image; and a sensing pixel row selector which selects a pixel row to be sensed among the first to $n^{th}$ pixel rows based on the determined sensing method.

The panel driver senses the first pixel row or the $n^{th}$ pixel row in the non-sensing frame periods.

The panel driver senses the first pixel row in each of the non-sensing frame periods.

The panel driver senses the $n^{th}$ pixel row in each of the non-sensing frame periods.

A number of the consecutive non-sensing frame periods is greater than or equal to a first reference value and less than or equal to a second reference value greater than the first reference value.

The input image data correspond to the low grayscale image when a ratio of grayscales less than or equal to a reference grayscale among grayscales of the input image data is greater than or equal to a reference ratio.

The panel driver randomly or sequentially senses one of the first to $n^{th}$ pixel rows in each sensing and non-sensing frame period when the input image data do not correspond to the low grayscale image.

The display device may further include a temperature calculator which calculates temperature data for the display panel based on the sensing data.

The display device may further include an overcurrent detector which detects an overcurrent of the display panel based on the sensing data.

A method of driving a display device according to an embodiment of the present disclosure includes: determining whether input image data correspond to a low grayscale image; and randomly sensing one of first to $n^{th}$ pixel rows in each of a plurality of sensing frame periods when the input image data correspond to the low grayscale image, wherein the sensing frame periods are repeated and consecutive non-sensing frame periods are provided between the sensing frame periods, wherein n is a natural number greater than 1.

The first to $n^{th}$ pixel rows are not sensed in the non-sensing frame periods.

The first pixel row or the $n^{th}$ pixel row is sensed in the non-sensing frame periods.

The input image data correspond to the low grayscale image when a ratio of grayscales less than or equal to a reference grayscale among grayscales of the input image data is greater than or equal to a reference ratio.

The method further includes randomly or sequentially sensing one of the first to $n^{th}$ pixel rows in each of the sensing and non-sensing frame periods when the input image data do not correspond to the low grayscale image.

In the display device and the method of driving the display device according to the embodiments, pixel rows may be intermittently and randomly sensed when input image data correspond to a low grayscale image. This way, a horizontal line in the low grayscale image due to sensing may not be visually recognized by a user. Accordingly, image quality of the display device may be improved, and sensing data for generating temperature data and detecting an overcurrent of a display panel may be secured.

BRIEF DESCRIPTION OF THE DRAWINGS

Illustrative, non-limiting embodiments of the present disclosure will be more clearly understood from the following detailed description taken in conjunction with the accompanying drawings.

FIG. 10 is a table illustrating a histogram for grayscales of the input image data in FIG. 9.

DETAILED DESCRIPTION OF THE EMBODIMENTS

Figure 1:
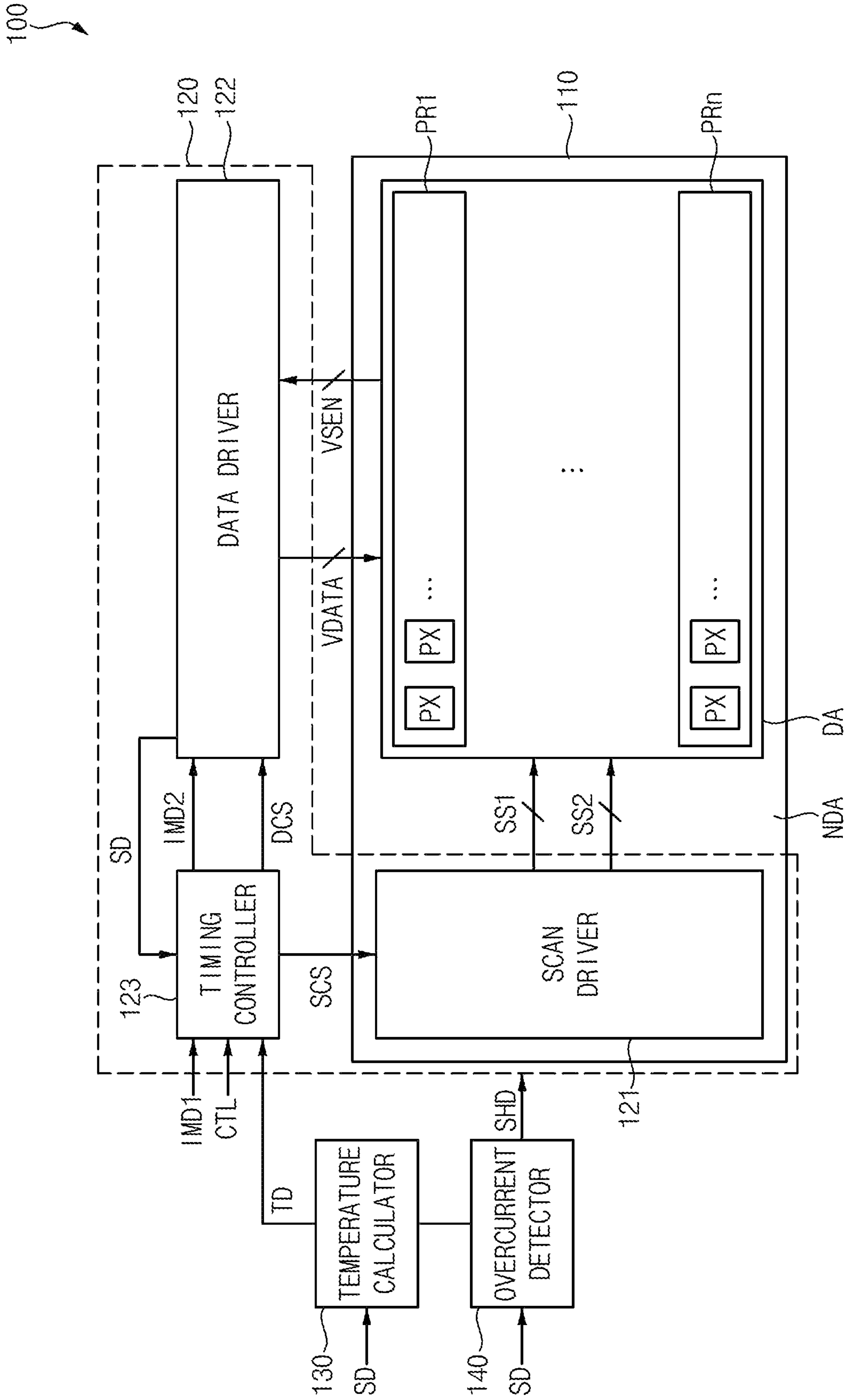
FIG. 1 is a block diagram illustrating a display device according to an embodiment.

Hereinafter, a display device and a method of driving a display device according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment.

Referring to FIG. 1, the display device 100 may include a display panel 110, a panel driver 120, a temperature calculator 130, and an overcurrent detector 140. Each of the panel driver 120, the temperature calculator 130 and the overcurrent detector 140 may be implemented by an electronic circuit.

The display panel 110 may include a display area DA and a non-display area NDA. The display area DA may display an image. The non-display area NDA may be adjacent to the display area DA. In an embodiment, the non-display area NDA may surround the display area DA. In an embodiment, the non-display area NDA may be disposed on just one side of the display area DA. The non-display area NDA may not display an image.

The display panel 110 may include a plurality of pixels PX. The pixels PX may be disposed in the display area DA of the display panel 110. In an embodiment, the pixels PX may include red pixels for emitting red light, green pixels for emitting green light, and blue pixels for emitting blue light. The pixels PX may form first to $n^{th}$ pixel rows PR1, . . . , PRn (n is a natural number greater than 1). Each of the pixel rows PR1, . . . , PRn may extend in a first direction, and the pixel rows PR1, . . . , PRn may be arranged in a second direction crossing the first direction. In an embodiment, the pixels PX may form 2160 pixel rows. In other words, n may be 2160. Hereinafter, it is described that n is 2160. However, the pixels PX may form more or less than 2160 pixel rows.

The panel driver 120 may drive the display panel 110 based on input image data IMD1. In other words, the panel driver 120 may drive the display panel 110 in response to input image data IMD1. The panel driver 120 may include a scan driver 121, a data driver 122, and a timing controller 123.

The scan driver 121 may provide first scan signals SS1 and second scan signals SS2 to the pixels PX. The scan driver 121 may provide sequentially shifted first scan signals SS1 and second scan signals SS2 to the pixel rows PR1, . . . , PRn, respectively. The scan driver 121 may generate the first scan signals SS1 and the second scan signals SS2 based on a first control signal SCS. The first control signal SCS may include a scan start signal, a scan clock signal, or the like. In an embodiment, the scan driver 121 may be disposed in the non-display area NDA of the display panel 110.

The data driver 122 may provide data voltages VDATA to the pixels PX. The data driver 122 may generate the data voltages VDATA based on output image data IMD2 and a second control signal DCS. In other words, the data driver 122 may generate the data voltages VDATA in response to output image data IMD2. The output image data IMD2 may include grayscales respectively corresponding to the pixels PX. The second control signal DCS may include a data start signal, a data clock signal, a load signal, or the like. The data voltages VDATA may correspond to the grayscales of the output image data IMD2.

In an embodiment, the data driver 122 may be implemented as one or more integrated circuits, and may be disposed on a printed circuit board connected to the display panel 110. An integrated circuit in which the data driver 122 is implemented may be referred to as a readout source driver integrated circuit ("RSIC").

The timing controller 123 may control driving (or operation) of the scan driver 121 and driving (or operation) of the data driver 122. The timing controller 123 may generate the output image data IMD2, the first control signal SCS, and the second control signal DCS based on the input image data IMD1, a control signal CTL, sensing data SD, and temperature data TD. In other words, the timing controller 123 may generate the output image data IMD2, the first control signal SCS, and the second control signal DCS in response to the input image data IMD1, the control signal CTL, the sensing data SD, and the temperature data TD. The input image data IMD1 may include grayscales respectively corresponding to the pixels PX. The control signal CTL may include a clock signal, a vertical synchronizing signal, a horizontal synchronizing signal, or the like. The sensing data SD may include sensing voltages VSEN and sensing currents of the pixels PX. The temperature data TD may include temperatures of a plurality of blocks included in the display panel 110.

The timing controller 123 may compensate for a deviation in characteristics between the pixels PX (e.g., a deviation in threshold voltages between driving transistors of the pixels PX, a deviation in mobilities between the driving transistors of the pixels PX, etc.) based on the sensing data SD. The timing controller 123 may generate the output image data IMD2 by compensating the input image data IMD1 based on the sensing data SD.

In an embodiment, the timing controller 123 may be implemented as one or more integrated circuits, and may be disposed on a printed circuit board connected to the display panel 110. In another embodiment, the data driver 122 and the timing controller 123 may be implemented as a single integrated circuit. An integrated circuit in which the data driver 122 and the timing controller 123 are implemented may be referred to as a timing controller embedded data driver ("TED").

The panel driver 120 may generate the sensing data SD by sensing the pixels PX. The data driver 122 may receive the sensing voltages VSEN from the pixels PX, may calculate sensing currents of the pixels PX based on the sensing voltages VSEN, and may generate the sensing data SD based on the sensing voltages VSEN and the sensing currents.

When the input image data IMD1 correspond to a low grayscale image, the panel driver 120 may randomly sense one of the first to $n^{th}$ pixel rows PR1, . . . , PRn in each of sensing frame periods repeated with consecutive non-sensing frame periods in between. In other words, if the input image data IMD1 represents a low grayscale image, the panel driver 120 may select one of the first to $n^{th}$ pixel rows PR1, . . . , PRn at random during each sensing frame period. The sensing frame periods may be repeated and consecutive non-sensing frames periods may be provided between a pair of sensing frame periods. In an embodiment, the panel driver 120 may not sense the first to $n^{th}$ pixel rows PR1, . . . , PRn in the non-sensing frame periods. In another embodiment, the panel driver 120 may sense the first pixel row PR1 or the $n^{th}$ pixel row PRn in the non-sensing frame periods.

When the input image data IMD1 do not correspond to the low grayscale image, the panel driver 120 may randomly or sequentially sense one of the first to $n^{th}$ pixel rows PR1, . . . , PRn in each frame period. In other words, if the input image data IMD1 represents a low grayscale image, the panel driver 120 may randomly or sequentially sense one of the first to $n^{th}$ pixel rows PR1, . . . , PRn in each frame period.

The temperature calculator 130 may calculate the temperature data TD for the display panel 110 based on the sensing data SD. The temperature calculator 130 may divide the display panel 110 into a plurality of blocks, and may generate the temperature data TD by calculating temperatures for the blocks based on the sensing data SD. The timing controller 123 may compensate for a deviation in luminances between the blocks due to the temperatures of the blocks based on the temperature data TD. The timing controller 123 may generate the output image data IMD2 by compensating the input image data IMD1 based on the temperature data TD.

The overcurrent detector 140 may detect an overcurrent of the display panel 110 based on the sensing data SD. The overcurrent detector 140 may detect the overcurrent of the display panel 110 based on the sensing currents included in the sensing data SD. The overcurrent detector 140 may provide a shutdown signal SHD to the panel driver 120 when the overcurrent flows through the display panel 110. When the shutdown signal SHD is provided to the panel driver 120, the operation of the scan driver 121 and/or the data driver 122 may be stopped.

Figure 2:
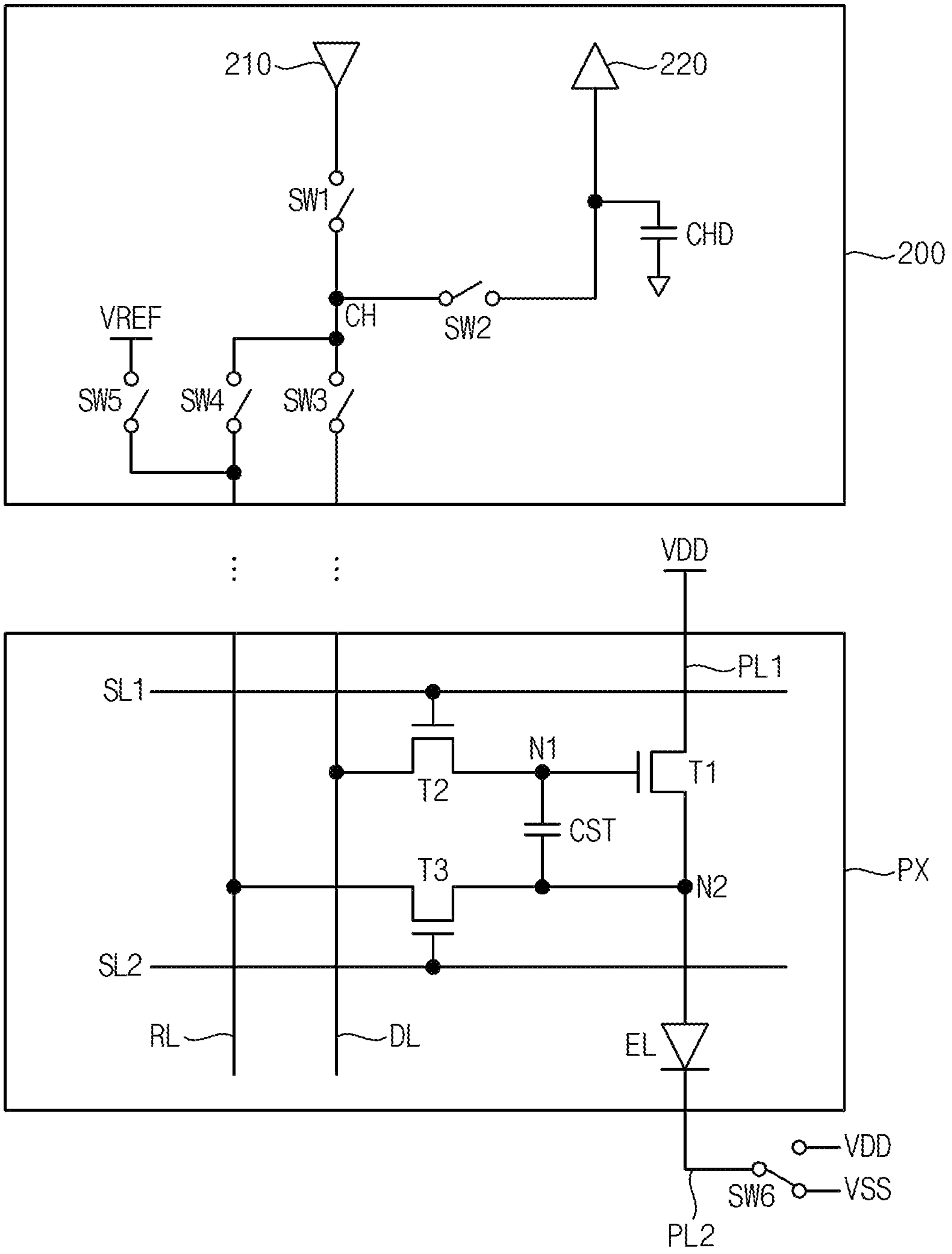
FIG. 2 is a circuit diagram illustrating a pixel and a data driving circuit connected to the pixel according to an embodiment.

FIG. 2 is a circuit diagram illustrating a pixel PX and a data driving circuit 200 connected to the pixel PX according to an embodiment. The pixel PX in FIG. 2 may represent one of the pixels PX included in the display device 100 in FIG. 1, and the data driving circuit 200 in FIG. 2 may represent a portion of the data driver 122 included in the display device 100 in FIG. 1.

Referring to FIG. 2, the pixel PX may include a first transistor T1, a second transistor T2, a third transistor T3, a storage capacitor CST, and a light emitting diode EL.

The first transistor T1 may be connected between a first power line PL1 for transmitting a first power voltage VDD and a second node N2. A first electrode of the first transistor T1 may be connected to the first power line PL1, and a second electrode of the first transistor T1 may be connected to the second node N2. A gate electrode (or third electrode) of the first transistor T1 may be connected to a first node N1. The first transistor T1 may be referred to as a driving transistor.

The second transistor T2 may be connected between a data line DL for transmitting a data voltage VDATA and the first node N1. A first electrode of the second transistor T2 may be connected to the data line DL, and a second electrode of the second transistor T2 may be connected to the first node N1. A gate electrode (or third electrode) of the second transistor T2 may be connected to a first scan line SL1 for transmitting the first scan signal SS1. The second transistor T2 may be referred to as a write transistor.

The third transistor T3 may be connected between a reference line RL for transmitting a reference voltage VREF and the second node N2. A first electrode of the third transistor T3 may be connected to the reference line RL, and a second electrode of the third transistor T3 may be connected to the second node N2. A gate electrode (or third electrode) of the third transistor T3 may be connected to a second scan line SL2 for transmitting the second scan signal SS2. The third transistor T3 may be referred to as a reference transistor or a sensing transistor.

FIG. 2 illustrates an embodiment in which each of the first transistor T1, the second transistor T2, and the third transistor T3 is an N-type transistor (e.g., an NMOS transistor), but the present disclosure is not limited thereto. In another embodiment, at least one of the first transistor T1, the second transistor T2, and the third transistor T3 may be a P-type transistor (e.g., a PMOS transistor).

The storage capacitor CST may be connected between the first node N1 and the second node N2. A first electrode of the storage capacitor CST may be connected to the first node N1, and a second electrode of the storage capacitor CST may be connected to the second node N2.

FIG. 2 illustrates an embodiment in which the pixel PX includes three transistors and one capacitor, but the present disclosure is not limited thereto. In another embodiment, the pixel PX may include four or more transistors and/or two or more capacitors.

The light emitting diode EL may be connected between the second node N2 and a second power line PL2. A first electrode of the light emitting diode EL may be connected to the second node N2, and a second electrode of the light emitting diode EL may be connected to the second power line PL2. In an embodiment, the light emitting diode EL may be an organic light emitting diode. In another embodiment, the light emitting diode EL may be a quantum dot light emitting diode, an inorganic light emitting diode, or the like.

A sixth switch SW6 may selectively provide the first power voltage VDD or a second power voltage VSS to the second power line PL2. A voltage level of the second power voltage VSS may be lower than a voltage level of the first power voltage VDD.

The data driving circuit 200 may include an output circuit 210, a sensing circuit 220, a hold capacitor CHD, a first switch SW1, a second switch SW2, a third switch SW3, a fourth switch SW4, and a fifth switch SW5.

The output circuit 210 may provide the data voltage VDATA to a channel CH. The sensing circuit 220 may receive the sensing voltage VSEN stored in the hold capacitor CHD. The hold capacitor CHD may be connected in parallel to the sensing circuit 220. The first switch SW1 may be connected between the output circuit 210 and the channel CH, and the second switch SW2 may be connected between the sensing circuit 220 and the channel CH. The third switch SW3 may be connected between the data line DL and the channel CH, and the fourth switch SW4 may be connected between the reference line RL and the channel CH. The fifth switch SW5 may selectively provide the reference voltage VREF to the reference line RL.

Each of the frame periods may include an active period and a vertical blank period. When a pixel row (e.g., a sensing pixel row) is sensed in a frame period, a pixel PX included in the sensing pixel row may emit light in the active period of the frame period, and the pixel PX included in the sensing pixel row may be sensed by the panel driver 120 in the vertical blank period of the frame period. In the active period, the data driving circuit 200 may provide a data voltage VDATA for display to the pixel PX, and the pixel PX may emit light based on the data voltage VDATA for display. In other words, in the active period, the data driving circuit 200 supplies the data voltage VDATA for image display to the pixel PX, which causes the pixel PX to emit light and display the corresponding image. In the vertical blank period, the data driving circuit 200 may provide a data voltage VDATA for sensing to the pixel PX, and the pixel PX may provide the sensing voltage VSEN to the data driving circuit 200 based on the data voltage VDATA for sensing. In other words, in the vertical blank period, the data driving circuit 200 provides the data voltage VDATA for sensing to the pixel PX. The pixel PX will then produce a sensing voltage VSEN and send it back to the data driving circuit 200.

Hereinafter, operations of the pixel PX included in the sensing pixel row and the data driving circuit 200 connected thereto will be described with reference to FIGS. 3 to 7.

Figure 3:
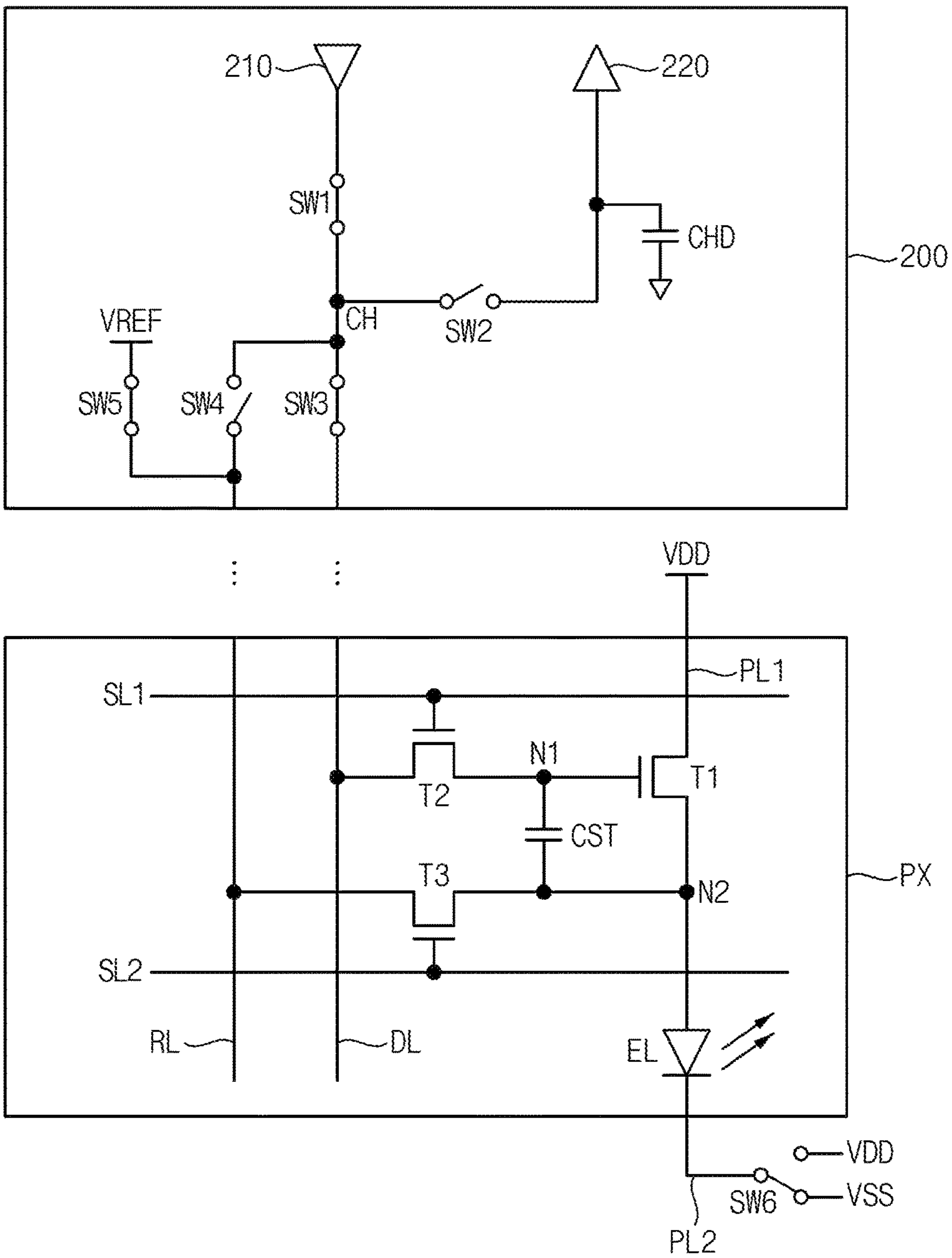
FIG. 3 is a circuit diagram illustrating operations of the pixel and the data driving circuit connected to the pixel in an active period.
Figure 4:
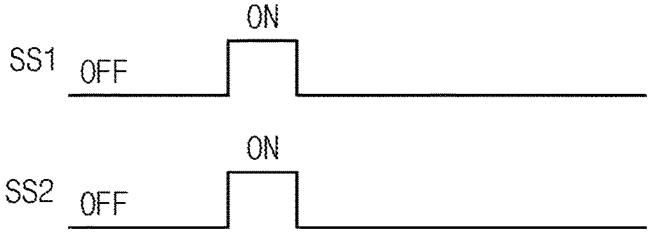
FIG. 4 is a diagram for describing the operations of the pixel and the data driving circuit connected to the pixel in the active period.

FIG. 3 is a circuit diagram illustrating operations of the pixel PX and the data driving circuit 200 connected to the pixel PX in the active period. FIG. 4 is a diagram for describing the operations of the pixel PX and the data driving circuit 200 connected to the pixel PX in the active period.

Referring to FIGS. 3 and 4, in the active period, the first switch SW1, the third switch SW3, and the fifth switch SW5 may be turned on, and the second switch SW2 and the fourth switch SW4 may be turned off. Accordingly, the data line DL may be connected to the output circuit 210 and the reference voltage VREF may be provided to the reference line RL. The sixth switch SW6 may provide the second power voltage VSS to the second power line PL2.

In the active period, the output circuit 210 may provide the data voltage VDATA for display to the data line DL, and the reference voltage VREF may be provided to the reference line RL. When the second transistor T2 and the third transistor T3 are simultaneously turned on in response to the first scan signal SS1 and the second scan signal SS2, respectively, the storage capacitor CST may charge a voltage (VDATA-VREF) corresponding to a difference between the data voltage VDATA for display and the reference voltage VREF, and may provide the voltage (VDATA-VREF) as a driving voltage of the first transistor T1. The first transistor T1 may generate a driving current flowing through the first transistor T1 based on the driving voltage, and the light emitting diode EL may emit light in proportion to the driving current of the first transistor T1.

Figure 5:
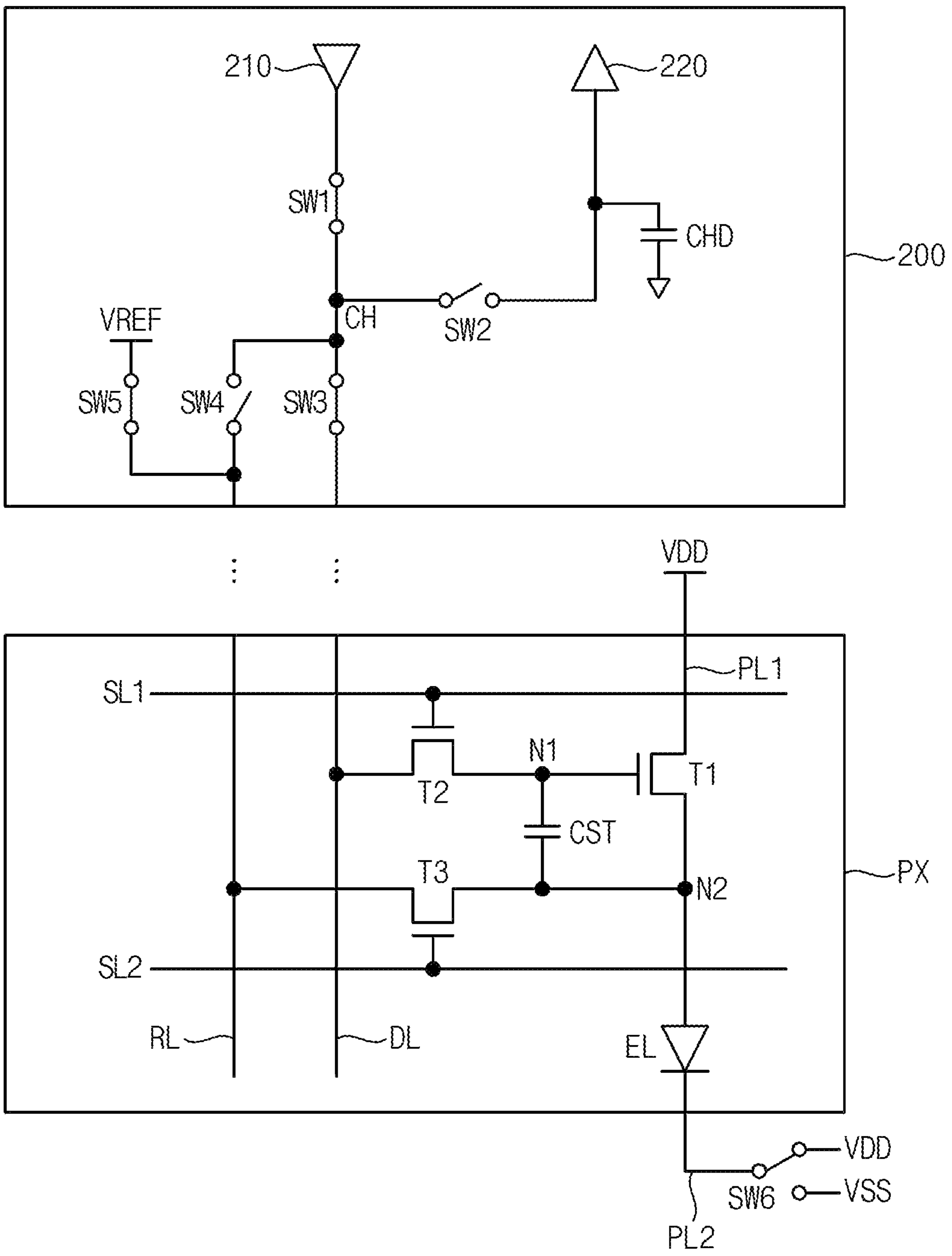
FIGS. 5 and 6 are circuit diagrams illustrating operations of the pixel and the data driving circuit connected to the pixel in a vertical blank period.
Figure 6:
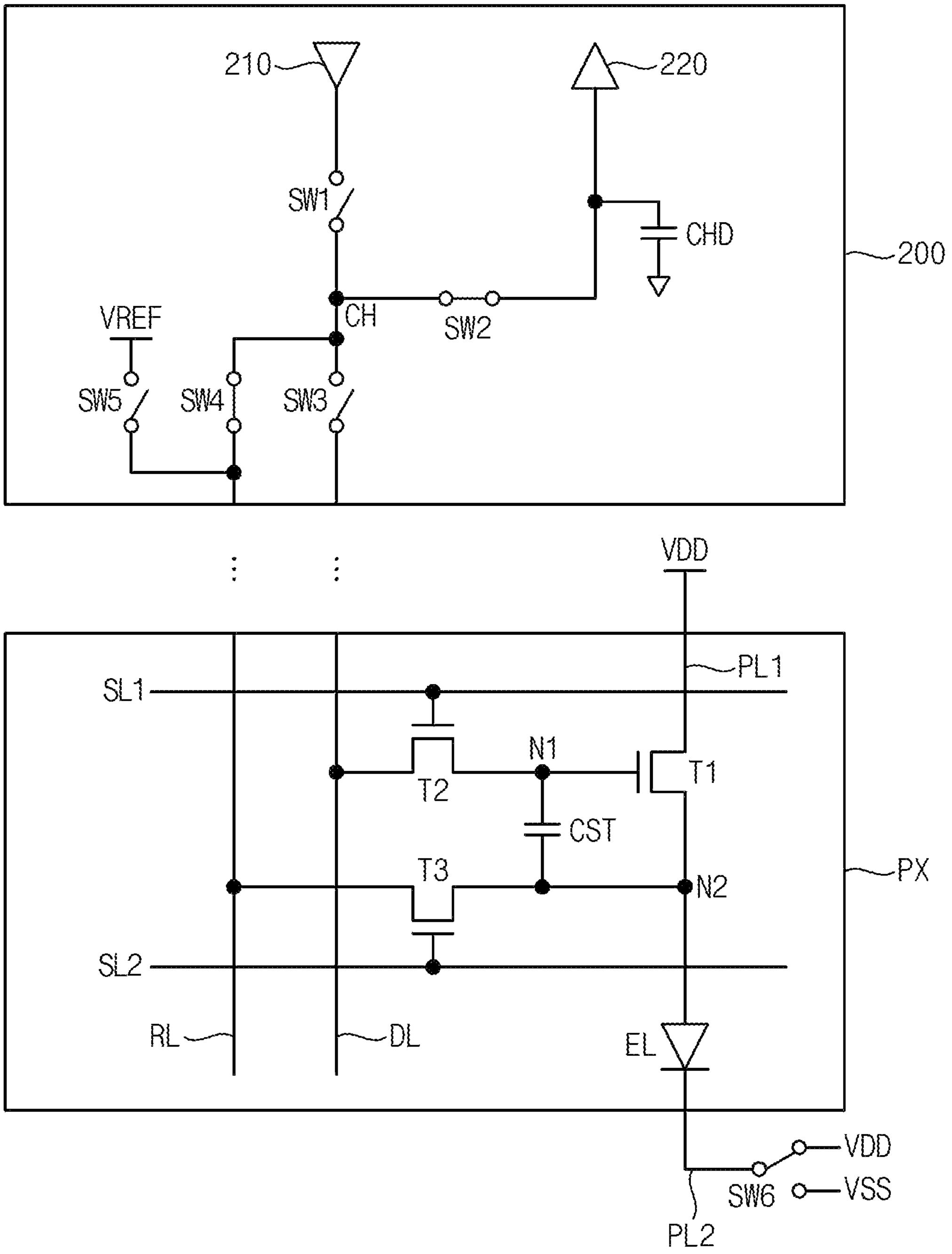
Figure 7:
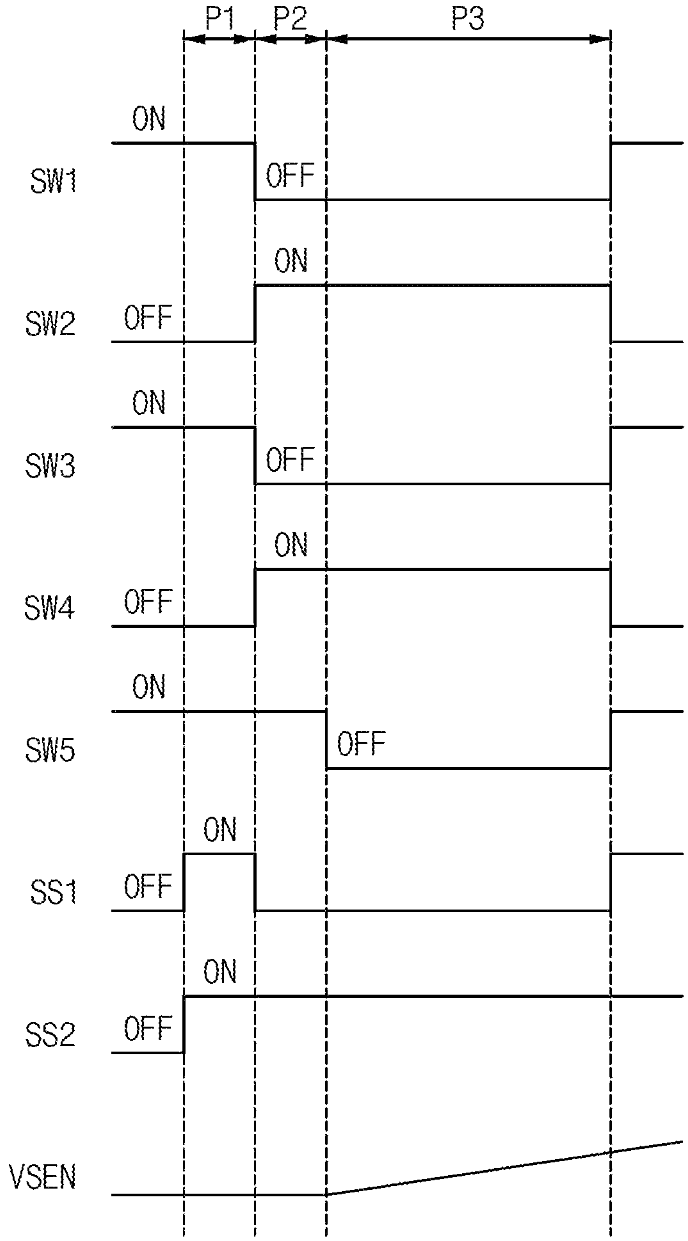
FIG. 7 is a diagram for describing the operations of the pixel and the data driving circuit connected to the pixel in the vertical blank period.

FIGS. 5 and 6 are circuit diagrams illustrating operations of the pixel PX and the data driving circuit 200 connected to the pixel PX in the vertical blank period. FIG. 7 is a diagram for describing the operations of the pixel PX and the data driving circuit 200 connected to the pixel PX in the vertical blank period.

Referring to FIGS. 5 to 7, in a first period P1 of the vertical blank period, the first switch SW1, the third switch SW3, and the fifth switch SW5 may be turned on, and the second switch SW2 and the fourth switch SW4 may be turned off. Accordingly, the data line DL may be connected to the output circuit 210, and the reference voltage VREF may be provided to the reference line RL. The sixth switch SW6 may provide the first power voltage VDD to the second power line PL2.

In the first period P1, the output circuit 210 may provide the data voltage VDATA for sensing to the data line DL, and the reference voltage VREF may be provided to the reference line RL. When the second transistor T2 and the third transistor T3 are simultaneously turned on in response to the first scan signal SS1 and the second scan signal SS2, respectively, the storage capacitor CST may charge a voltage (VDATA-VREF) corresponding to a difference between the data voltage VDATA for sensing and the reference voltage VREF, and may provide the voltage (VDATA-VREF) as a driving voltage of the first transistor T1. In this case, since the first power voltage VDD is provided to the second power line PL2, the light emitting diode EL may be negatively biased and the light emitting diode EL may not emit light.

In a second period P2 of the vertical blank period, the first switch SW1 and the third switch SW3 may be turned off, and the second switch SW2 and the fourth switch SW4 may be turned on. The fifth switch SW5 may maintain a turn-on state. Accordingly, the channel CH may be pre-charged with the reference voltage VREF.

In a third period P3 of the vertical blank period, the fifth switch SW5 may be turned off. Accordingly, a sensing current flowing through the first transistor T1 may be generated based on the driving voltage of the first transistor T1, and a voltage of the reference line RL may increase while the sensing current flows through the holding capacitor CHD via the reference line RL. The sensing circuit 220 may read the voltage of the reference line RL as the sensing voltage VSEN, and the sensing circuit 220 may calculate the sensing current using the sensing voltage VSEN.

After the third period P3 of the vertical blank period, the data driving circuit 200 may provide the data voltage VDATA for display that was provided before providing the data voltage VDATA for sensing to the pixel PX again. In other words, after the third period P3 of the vertical blank period, the data driving circuit 200 may provide the data voltage VDATA for display, which was provided to the pixel PX in the active period, to the pixel PX again, and the pixel PX may emit the light emitted in the active period again. For example, following the third period P3 of the vertical blank period, the data driving circuit 200 supplies the same data voltage VDATA used during the active period to the pixel PX once again, causing the pixel PX to emit light and reproduce the same image as during the active period.

The driving current of the pixel PX may decrease over time due to current leakage generated from the first electrode of the light emitting diode EL. Accordingly, when the data voltage VDATA for display is provided to the pixel PX again after the third period P3 of the vertical blank period, a difference in luminance between the sensing pixel row sensed by the panel driver 120 and a neighboring pixel row adjacent to the sensing pixel row may occur. For example, assuming that the driving current for displaying 255 grayscale is about 10 amperes (A), during the vertical blank period, the driving current of the pixel PX included in the neighboring pixel row may decrease from about 10 A, and the driving current of the pixel PX included in the sensing pixel row may be about 10 A when the data voltage VDATA for display is provided. Accordingly, the difference in luminance between the sensing pixel row and the neighboring pixel row may occur, and the sensing pixel row may be recognized as a horizontal line due to the luminance difference.

When the panel driver 120 randomly senses pixel rows, the degree of visibility of the sensing pixel row may decrease. However, since the difference in luminance occurring in a low grayscale image (or low luminance image) is easier for a user to recognize than a difference in luminance occurring in a high grayscale image (or high luminance image), even though the pixel rows are randomly sensed, the sensing pixel row may still be recognized by the user in the low grayscale image.

When the pixel rows are not sensed in the low grayscale image, the sensing pixel row may not be recognized by a user in the low grayscale image. However, since the sensing data SD is not generated in the low grayscale image, the temperature calculator 130 and the overcurrent detector 140 operating based on the sensing data SD may not properly operate. Accordingly, a deviation in luminance of an image may occur, and the display panel 110 may be burnt due to an overcurrent.

Figure 8:
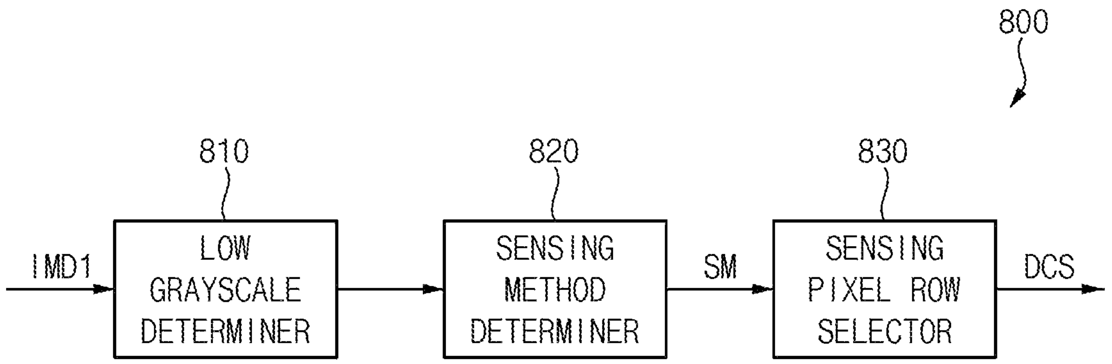
FIG. 8 is a block diagram illustrating a timing controller according to an embodiment.
Figure 9:
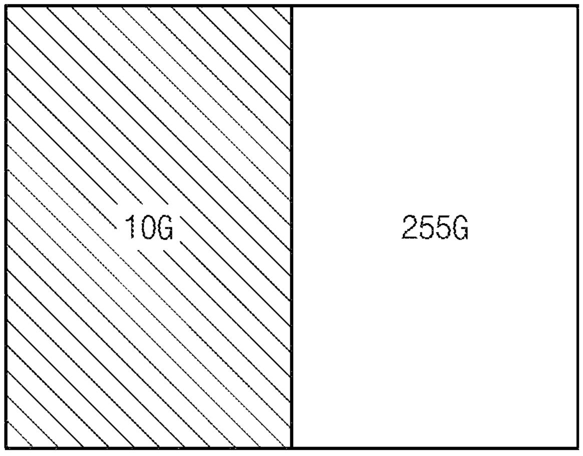
FIG. 9 is a diagram illustrating an image corresponding to input image data according to an embodiment.
Figure 11:
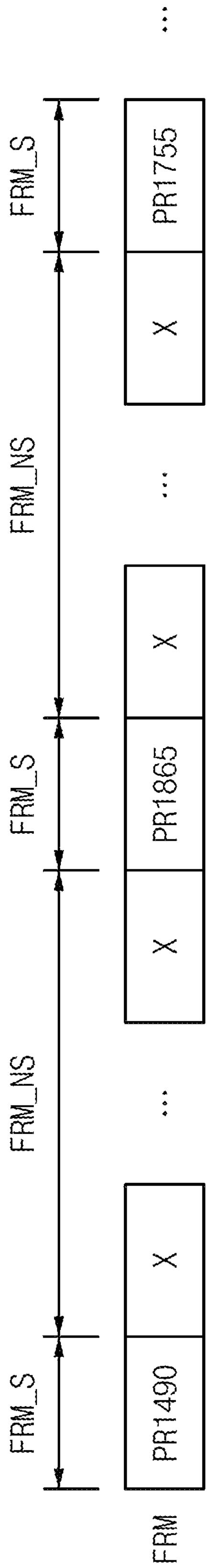
FIGS. 11, 12, and 13 are diagrams for describing intermittent random sensing methods according to embodiments.
Figure 12:
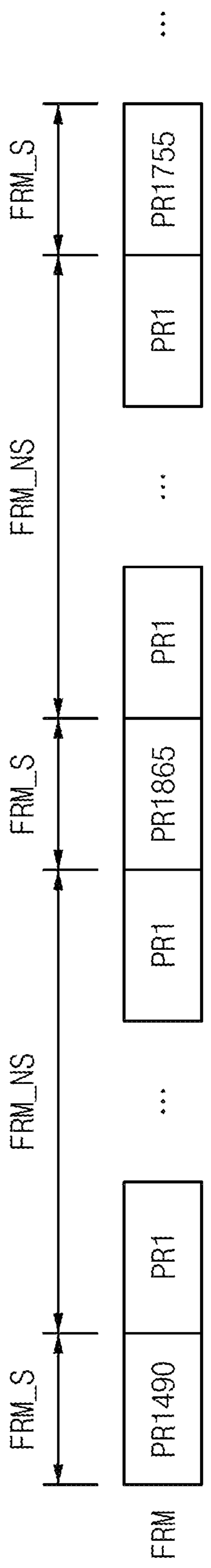
Figure 13:
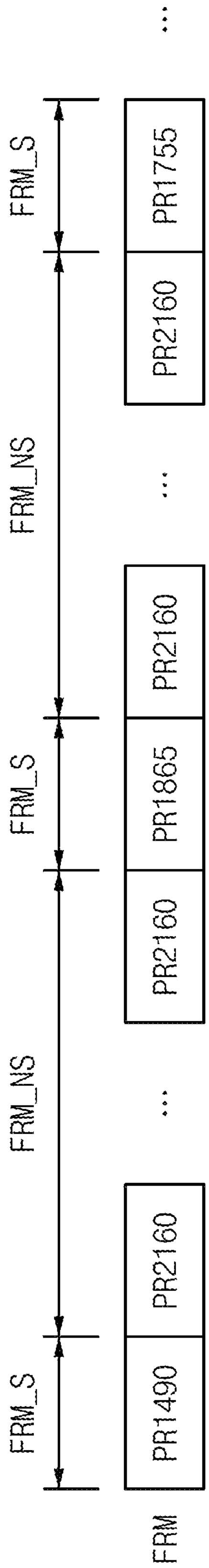
Figure 14:
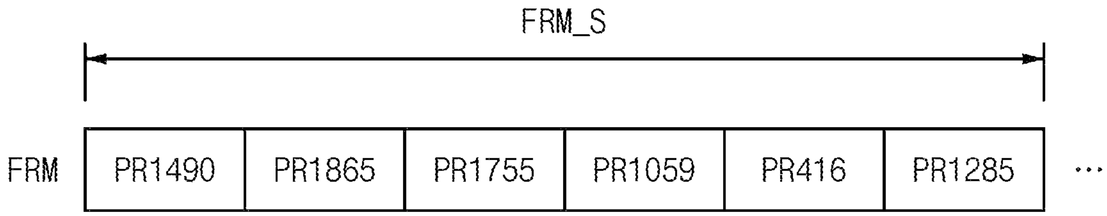
FIG. 14 is a diagram for describing a continuous random sensing method according to an embodiment.
Figure 15:
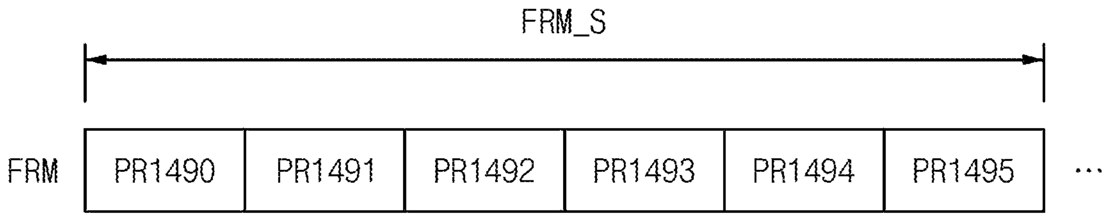
FIG. 15 is a diagram for describing a continuous sequential sensing method according to an embodiment.

FIG. 8 is a block diagram illustrating a timing controller 800 according to an embodiment. The timing controller 800 in FIG. 8 may represent the timing controller 123 included in the display device 100 in FIG. 1. FIG. 9 is a diagram illustrating an image corresponding to the input image data IMD1 according to an embodiment. FIG. 10 is a table illustrating a histogram for grayscales 10G and 255G of the input image data IMD1 in FIG. 9. FIGS. 11, 12, and 13 are diagrams for describing intermittent random sensing methods according to embodiments. FIG. 14 is a diagram for describing a continuous random sensing method according to an embodiment. FIG. 15 is a diagram for describing a continuous sequential sensing method according to an embodiment.

Referring to FIGS. 8 to 15, the timing controller 800 may include a low grayscale determiner 810, a sensing method determiner 820, and a sensing pixel row selector 830. The low grayscale determiner 810 may determine whether the input image data IMD1 correspond to a low grayscale image.

In an embodiment, the low grayscale determiner 810 may determine that the input image data IMD1 correspond to the low grayscale image when a ratio of grayscales less than or equal to a reference grayscale RG among the grayscales of the input image data IMD1 is greater than or equal to a reference ratio. The low grayscale determiner 810 may generate a histogram for the grayscales of the input image data IMD1, and may compare the grayscales of the input image data IMD1 with the reference grayscale RG based on the histogram. The histogram may be divided into 16 sections H00, H01, . . . , H14, H15, and each of the sections H00, H01, . . . , H14, H15 may include the number of pixels PX displaying grayscales between a start grayscale and an end grayscale.

For example, as illustrated in FIGS. 9 and 10, half of the grayscales of the input image data IMD1 are 10 grayscale 10G, and the other half of the grayscales of the input image data IMD1 are 255 grayscale 255G. Further, when the number the pixels PX are 8,294,400 (for example, a resolution of the display panel is 3840×2160), the reference grayscale RG is 15 grayscale 15G, and the reference ratio is 0.3, the number of pixels in the section H02 may be 4,147,200, and the number of pixels in the section H15 may be 4,147,200. Since the reference grayscale RG is 15 grayscale 15G, the number of grayscales less than or equal to the reference grayscale among the grayscales of the input image data IMD1 may be 4,147,200. Since the number of the pixels PX is 8,294,400, the ratio of grayscales less than or equal to the reference grayscale among the grayscales of the input image data IMD1 may be 0.5 (=4,147,200/8,294,400). Since the reference ratio is 0.3, the low grayscale determiner 810 may determine that the input image data IMD1 illustrated in FIG. 9 correspond to the low grayscale image.

In another embodiment, the low grayscale determiner 810 may determine that the input image data IMD1 correspond to the low grayscale image when an average of the grayscales of the input image data IMD1 is less than or equal to the reference grayscale RG.

The sensing method determiner 820 may determine a sensing method SM of the first to $n^{th}$ pixel rows PR1, . . . , PRn according to whether the input image data IMD1 correspond to the low grayscale image.

When the input image data IMD1 correspond to the low grayscale image, the sensing method determiner 820 may determine an intermittent random sensing method in which one of the first to $n^{th}$ pixel rows PR1, . . . , PRn is randomly sensed in each of sensing frame periods FRM_S repeated with consecutive non-sensing frame periods FRM_NS in between as the sensing method SM. In other words, if the input image data IMD1 represents a low grayscale image, the sensing method determiner 820 determines that one of the first to $n^{th}$ pixel rows PR1, . . . , PRn is to be randomly sensed in each of the sensing frame periods FRM_S. For example, a time width of the frame period may be about 8.33 ms when a driving frequency of the display device 100 is 120 Hz, and one of the first to $n^{th}$ pixel rows PR1, . . . , PRn may be randomly sensed in each sensing frame period FRM_S repeated at a time interval of 8.33 ms×@ when the input image data IMD1 correspond to the low grayscale image (@ is a natural number greater than or equal to 2).

In an embodiment, the first to $n^{th}$ pixel rows PR1, . . . , PRn may not be sensed in the non-sensing frame periods FRM_NS. For example, as illustrated in FIG. 11, the $1490^{th}$ pixel row PR1490 may be sensed in a first sensing frame period FRM_S, the pixel rows PR1, . . . , PRn may not be sensed in consecutive non-sensing frame periods FRM_NS after the first sensing frame period FRM_S, the $1865^{th}$ pixel row PR1865 may be sensed in a second sensing frame period FRM_S, the pixel rows PR1, . . . , PRn may not be sensed in consecutive non-sensing frame periods FRM_NS after the second sensing frame period FRM_S, and the $1755^{th}$ pixel row PR1755 may be sensed in a third sensing frame period FRM_S.

When the pixel rows PR1, . . . , PRn are intermittently and randomly sensed in the low grayscale image, the pixel rows PR1, . . . , PRn may be sensed with a relatively low frequency, and thus, the user may not predict a time at which the sensing pixel row is sensed as well as a position of the sensing pixel row. Accordingly, the sensing pixel row may not be recognized by the user. Further, since the pixel rows PR1, . . . , PRn are intermittently and randomly sensed in the low grayscale image, the sensing data SD may be generated, and the temperature calculator 130 and the overcurrent detector 140 operating based on the sensing data SD may properly operate. As a result, reducing the deviation in luminance of the image can help the display panel 110 from experiencing an image burn due to overcurrent.

In an embodiment, the timing controller 800 may control a driving of the data driver 200 so that the first to $n^{th}$ pixel rows PR1, . . . , PRn are not sensed in the non-sensing frame periods FRM_NS. For example, in a vertical blank period of each of the non-sensing frame periods FRM_NS, the data driver 200 may not output the data voltage VDATA for sensing from the output circuit 210, or may turn off the first switch SW1 to disconnect the output circuit 210 from the channel CH. In this case, since the data voltages VDATA for sensing are not provided to the pixels PX in the vertical blank period of each of the non-sensing frame periods FRM_NS, the pixel rows PR1, . . . , PRn may not be sensed.

In an embodiment, the timing controller 800 may control a driving of the scan driver 121 so that the first to $n^{th}$ pixel rows PR1, . . . , PRn are not sensed in the non-sensing frame periods FRM_NS. For example, the scan driver 121 may provide the first scan signal SS1 for turning off the second transistor T2 to the gate electrode of the second transistor T2 of each of the pixels PX in the vertical blank period of each of the non-sensing frame periods FRM_NS. In other words, the scan driver 121 may provide the first scan signals SS1 having turn-off voltage levels to the pixels PX in the vertical blank period of each of the non-sensing frame periods FRM_NS. In this case, since the data voltages VDATA for sensing are not provided to the pixels PX in the vertical blank period of each of the non-sensing frame periods FRM_NS, the pixel rows PR1, . . . , PRn may not be sensed.

In an embodiment, the first pixel row PR1 may be sensed in each of the non-sensing frame periods FRM_NS. Since the first pixel row PR1 is positioned on one side of the display area DA of the display panel 110, even though the first pixel row PR1 is sensed in the non-sensing frame periods FRM_NS, the first pixel row PR1 may not be recognized by a user. For example, as illustrated in FIG. 12, the $1490^{th}$ pixel row PR1490 may be sensed in a first sensing frame period FRM_S, the first pixel row PR1 may be sensed in each of the consecutive non-sensing frame periods FRM_NS after the first sensing frame period FRM_S, the $1865^{th}$ pixel row PR1865 may be sensed in a second sensing frame period FRM_S, the first pixel row PR1 may be sensed in each of the consecutive non-sensing frame periods FRM_NS after the second sensing frame period FRM_S, and the $1755^{th}$ pixel row PR1755 may be sensed in a third sensing frame period FRM_S.

In an embodiment, the $n^{th}$ pixel row PRn may be sensed in each of the non-sensing frame periods FRM_NS. Since the $n^{th}$ pixel row PRn is positioned on the other side of the display area DA of the display panel 110, even though the $n^{th}$ pixel row PRn is sensed in the non-sensing frame periods FRM_NS, the $n^{th}$ pixel row PRn may not be recognized by a user. For example, as illustrated in FIG. 13, the $1490^{th}$ pixel row PR1490 may be sensed in a first sensing frame period FRM_S, the 2160 pixel row PR2160 may be sensed in each of the consecutive non-sensing frame periods FRM_NS after the first sensing frame period FRM_S, the $1865^{th}$ pixel row PR1865 may be sensed in a second sensing frame period FRM_S, the 2160 pixel row PR2160 may be sensed in each of the consecutive non-sensing frame periods FRM_NS after the second sensing frame period FRM_S, and the $1755^{th}$ pixel row PR1755 may be sensed in a third sensing frame period FRM_S.

The number of consecutive non-sensing frame periods FRM_NS may be greater than or equal to a first reference value and less than or equal to a second reference value greater than the first reference value. In other words, a lower limit and an upper limit on the number of consecutive non-sensing frame periods FRM_NS may exist. The first reference value may be the minimum value of the number of consecutive non-sensing frame periods FRM_NS that can be included such that the sensing pixel row cannot be recognized. The second reference value may be the maximum value of the number of consecutive non-sensing frame periods FRM_NS required to ensure that there is sufficient sensing data SD for the temperature calculator 130 and the overcurrent detector 140 to properly operate. When the number of consecutive non-sensing frame periods FRM_NS is less than the first reference value, the sensing pixel row may be recognized by a user in the low grayscale image. When the number of consecutive non-sensing frame periods FRM_NS is greater than the second reference value, sufficient sensing data SD may not be secured in the low grayscale image to permit proper operation of the temperature calculator 130 and the overcurrent detector 140.

When the input image data IMD1 do not correspond to the low grayscale image, the sensing method determiner 820 may determine a continuous sensing method in which one of the first to $n^{th}$ pixel rows PR1, . . . , PRn is randomly or sequentially sensed in each frame period as the sensing method SM.

In an embodiment, when the input image data IMD1 do not correspond to the low grayscale image, the sensing method determiner 820 may determine a continuous random sensing method in which one of the first to $n^{th}$ pixel rows PR1, . . . , PRn is randomly sensed in each frame period as the sensing method SM. For example, as illustrated in FIG. 14, the $1490^{th}$ pixel row PR1490, the $1865^{th}$ pixel row PR1865, the $1755^{th}$ pixel row PR1755, the $1059^{th}$ pixel row PR1059, the $416^{th}$ pixel row PR416, and the $1285^{th}$ pixel row PR1285 may be continuously sensed in the sensing frame periods FRM_S.

In another embodiment, when the input image data IMD1 do not correspond to the low grayscale image, the sensing method determiner 820 may determine a continuous sequential sensing method in which one of the first to $n^{th}$ pixel rows PR1, . . . , PRn is sequentially sensed in each frame period as the sensing method SM. For example, as illustrated in FIG. 15, the $1490^{th}$ pixel row PR1490, the $1491^{st}$ pixel row PR1491, the $1492^{nd}$ pixel row PR1492, the $1493^{rd}$ pixel row PR1493, the $1494^{th}$ pixel row PR1494, and the $1495^{th}$ pixel row PR1495 may be continuously sensed in the sensing frame periods FRM_S.

The sensing pixel row selector 830 may select a sensing pixel row from the first to $n^{th}$ pixel rows PR1, . . . , PRn. The sensing pixel row selector 830 may select the sensing pixel row based on the sensing method SM determined by the sensing method determiner 820. A number of the sensing pixel row may be included in the second control signal DCS.

Figure 16:
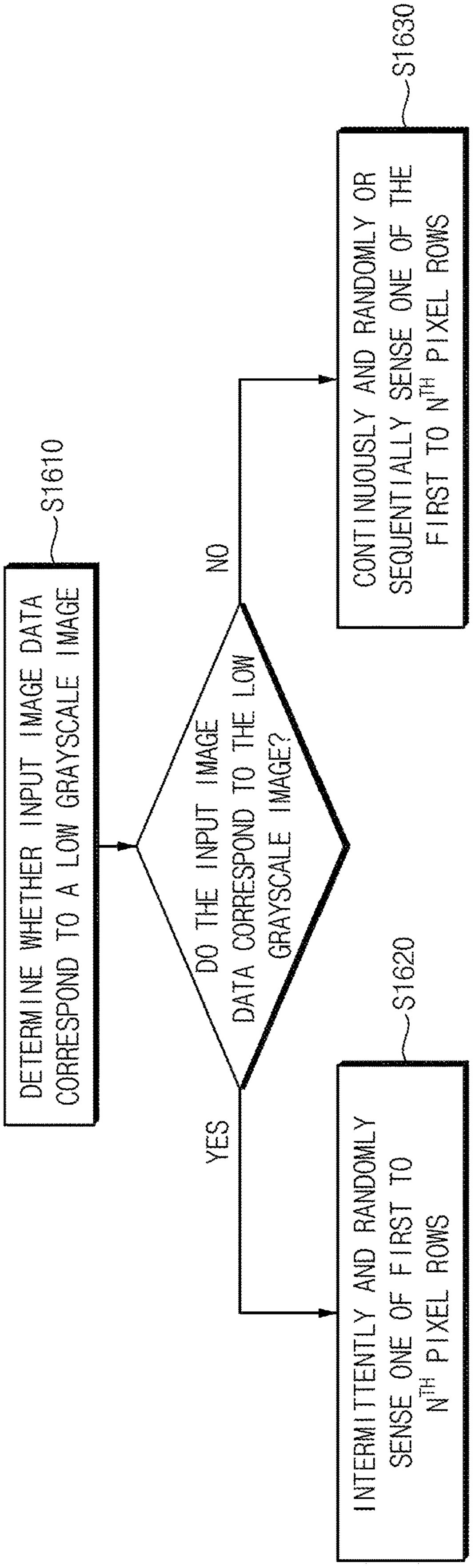
FIG. 16 is a flowchart illustrating a method of driving a display device according to an embodiment.

FIG. 16 is a flowchart illustrating a method of driving a display device 100 according to an embodiment.

Referring to FIG. 16, in the driving method of the display device 100, the panel driver 120 may determine whether the input image data IMD1 correspond to the low grayscale image (S1610). In an embodiment, the panel driver 120 may determine that the input image data IMD1 correspond to the low grayscale image when a ratio of grayscales less than or equal to the reference grayscale RG among the grayscales of the input image data IMD1 is greater than or equal to the reference ratio. The panel driver 120 may generate the histogram for the grayscales of the input image data IMD1, and may compare the grayscales of the input image data IMD1 with the reference grayscale RG based on the histogram. In another embodiment, the panel driver 120 may determine that the input image data IMD1 correspond to the low grayscale image when the average of the grayscales of the input image data IMD1 is less than or equal to the reference grayscale RG.

When the input image data IMD1 correspond to the low grayscale image, the panel driver 120 may intermittently and randomly sense one of the first to $n^{th}$ pixel rows PR1, . . . , PRn (S1620). For example, when the input image data IMD1 correspond to the low grayscale image, the panel driver 120 may randomly sense one of the first to $n^{th}$ pixel rows PR1, . . . , PRn in each of the sensing frame periods FRM_S repeated with the consecutive non-sensing frame periods FRM_NS in between.

In an embodiment, the first to $n^{th}$ pixel rows PR1, . . . , PRn may not be sensed in the non-sensing frame periods FRM_NS. In another embodiment, the first pixel row PR1 may be sensed in each of the non-sensing frame periods FRM_NS. In still another embodiment, the $n^{th}$ pixel row PRn may be sensed in each of the non-sensing frame periods FRM_NS.

When the input image data IMD1 do not correspond to the low grayscale image, the panel driver 120 may continuously and randomly or sequentially sense one of the first to $n^{th}$ pixel rows PR1, . . . , PRn (S1630). For example, when the input image data IMD1 do not correspond to the low grayscale image, the panel driver 120 may randomly or sequentially sense one of the first to $n^{th}$ pixel rows PR1, . . . , PRn in each frame period.

Figure 17:
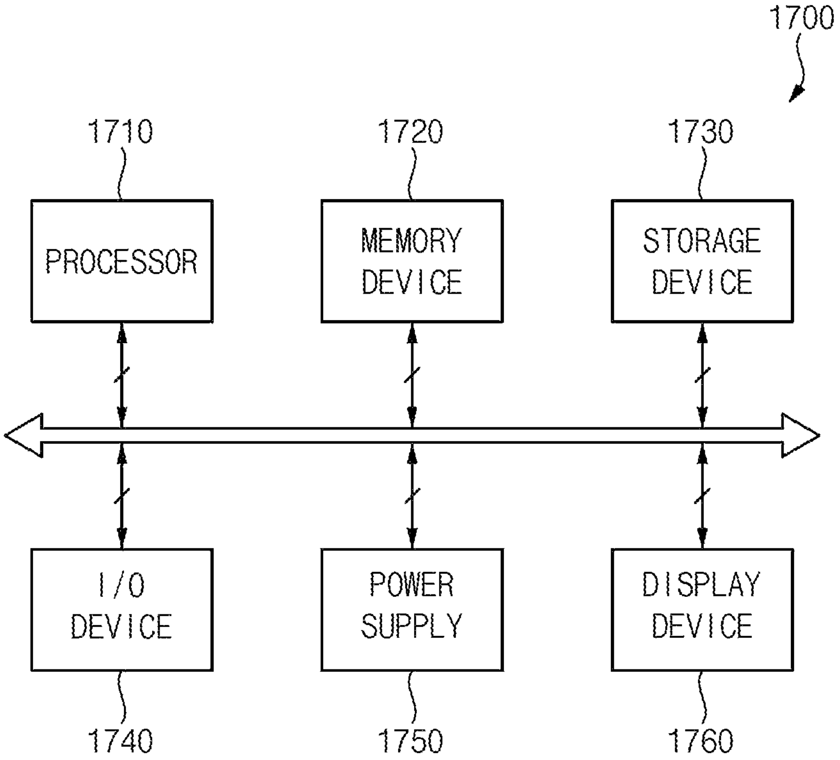
FIG. 17 is a block diagram illustrating an electronic apparatus including a display device according to an embodiment.

FIG. 17 is a block diagram illustrating an electronic apparatus 1700 including a display device 1760 according to an embodiment.

Referring to FIG. 17, the electronic apparatus 1700 may include a processor 1710, a memory device 1720, a storage device 1730, an input/output ("I/O") device 1740, a power supply 1750, and the display device 1760. The display device 1760 may be the display device 100 in FIG. 1. The electronic apparatus 1700 may further include a plurality of ports for communicating with a video card, a sound card, a memory card, a universal serial bus ("USB") device, etc.

The processor 1710 may perform calculations or tasks. In an embodiment, the processor 1710 may be a microprocessor, a central processing unit ("CPU"), or the like. The processor 1710 may be coupled to other components via an address bus, a control bus, a data bus, or the like. In an embodiment, the processor 1710 may be coupled to an extended bus such as a peripheral component interconnection ("PCI") bus.

The memory device 1720 may store data for operations of the electronic apparatus 1700. In an embodiment, the memory device 1720 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1730 may include a solid state drive ("SSD") device, a hard disk drive ("HDD") device, a CD-ROM device, or the like. The I/O device 1740 may include an input device such as a keyboard, a keypad, a touchpad, a touch-screen, a mouse device, etc., and an output device such as a speaker, a printer, etc. The power supply 1750 may supply a power required for the operation of the electronic apparatus 1700. The display device 1760 may be coupled to other components via the buses or other communication links.

In the display device 1760, pixel rows may be intermittently and randomly sensed when input image data correspond to a low grayscale image, so that a horizontal line due to sensing may not be recognized by a user in the low grayscale image. Accordingly, image quality of the display device 1760 may be improved, and sensing data may be secured.

The display device according to the embodiments may be applied to a display device included in a computer, a notebook, a mobile phone, a smart phone, a smart pad, a portable media player (PMP), a personal digital assistant (PDA), an MP3 player, or the like.

Although the display devices and the methods of driving the display devices according to the embodiments have been described with reference to the drawings, the illustrated embodiments are examples, and may be modified and changed by a person having ordinary knowledge in the relevant technical field without departing from the technical spirit of the present disclosure as set forth in the following claims.

What is claimed is:

1. A display device, comprising:

a display panel which includes a plurality of pixels arranged in first to $n^{th}$ pixel rows, wherein n is a natural number greater than 1; and a panel driver which drives the display panel in response to input image data during frame periods, and generates sensing data by sensing the plurality of pixels, each frame period comprises an active period and a vertical blank period, wherein the panel driver randomly senses one of the first to $n^{th}$ pixel rows in each of a plurality of sensing frame periods when the input image data correspond to a low grayscale image to prevent a horizontal line from being recognized due to a sensing in the low grayscale image, wherein the sensing frame periods are repeated with consecutive non-sensing frame periods provided therebetween, wherein, in the non-sensing frame periods, no sensing of the pixels is performed during the vertical blank period, and wherein, in the sensing frame periods, sensing of the pixels is performed during the vertical blank period.

2. The display device of claim 1, wherein the panel driver does not sense the first to $n^{th}$ pixel rows in the non-sensing frame periods.

3. The display device of claim 2, wherein the panel driver includes:

a scan driver which provides scan signals to the plurality of pixels;

a data driver which provides data voltages to the plurality of pixels, and receives sensing voltages from the plurality of pixels; and a timing controller which controls a driving of the scan driver and a driving of the data driver.

4. The display device of claim 3, wherein each of the plurality of pixels includes:

a first transistor connected between a first power line and a second node, wherein the first transistor has a gate electrode connected to a first node;

a second transistor connected between a data line and the first node, wherein the second transistor has a gate electrode connected to a first scan line;

a third transistor connected between a reference line and the second node, wherein the third transistor has a gate electrode connected to a second scan line;

a storage capacitor connected between the first node and the second node; and a light emitting diode connected between the second node and a second power line.

5. The display device of claim 4, wherein the timing controller controls the driving of the data driver such that the first to $n^{th}$ pixel rows are not sensed in the non-sensing frame periods.

6. The display device of claim 4, wherein the timing controller controls the driving of the scan driver such that the first to $n^{th}$ pixel rows are not sensed in the non-sensing frame periods.

7. The display device of claim 6, wherein a scan signal for turning-off the second transistor is provided to the gate electrode of the second transistor of each of the plurality of pixels in a vertical blank period of each of the non-sensing frame periods.

8. The display device of claim 3, wherein the timing controller includes:

a low grayscale determiner which determines whether the input image data correspond to the low grayscale image;

a sensing method determiner which determines a sensing method of the first to $n^{th}$ pixel rows according to whether the input image data correspond to the low grayscale image; and a sensing pixel row selector which selects a pixel row to be sensed among the first to $n^{th}$ pixel rows based on the determined sensing method.

9. The display device of claim 1, wherein the panel driver senses the first pixel row or the $n^{th}$ pixel row in the non-sensing frame periods.

10. The display device of claim 9, wherein the panel driver senses the first pixel row in each of the non-sensing frame periods.

11. The display device of claim 9, wherein the panel driver senses the $n^{th}$ pixel row in each of the non-sensing frame periods.

12. The display device of claim 1, wherein a number of the consecutive non-sensing frame periods is greater than or equal to a first reference value and less than or equal to a second reference value greater than the first reference value.

13. The display device of claim 1, wherein the input image data correspond to the low grayscale image when a ratio of grayscales less than or equal to a reference grayscale among grayscales of the input image data is greater than or equal to a reference ratio.

14. The display device of claim 1, wherein the panel driver randomly or sequentially senses one of the first to $n^{th}$ pixel rows in each of the sensing and non-sensing frame periods when the input image data do not correspond to the low grayscale image.

15. The display device of claim 1, further comprising:

a temperature calculator which calculates temperature data for the display panel based on the sensing data.

16. The display device of claim 1, further comprising:

an overcurrent detector which detects an overcurrent of the display panel based on the sensing data.

17. A method of driving a display device, the method comprising:

driving a display panel of the display device in response to input image data during frame periods, each frame period comprises an active period and a vertical blank period;

determining whether the input image data correspond to a low grayscale image; and randomly sensing one of first to $n^{th}$ pixel rows in each of a plurality of sensing frame periods when the input image data correspond to the low grayscale image to prevent a horizontal line from being recognized due to a sensing in the low grayscale image, wherein the sensing frame periods are repeated with consecutive non-sensing frame periods provided therebetween, wherein n is a natural number greater than 1, wherein, in the non-sensing frame periods, no sensing of pixels is performed during the vertical blank period, and wherein, in the sensing frame periods, sensing of the pixels is performed during the vertical blank period.

18. The method of claim 17, wherein the first pixel row or the $n^{th}$ pixel row is sensed in the non-sensing frame periods.

19. The method of claim 17, wherein the input image data correspond to the low grayscale image when a ratio of grayscales less than or equal to a reference grayscale among grayscales of the input image data is greater than or equal to a reference ratio.

20. The method of claim 17, further comprising:

randomly or sequentially sensing one of the first to $n^{th}$ pixel rows in each of the sensing and non-sensing frame periods when the input image data do not correspond to the low grayscale image.

21. An electronic device, comprising:

a display panel which includes a plurality of pixels arranged in first to $n^{th}$ pixel rows, wherein n is a natural number greater than 1; and a panel driver which drives the display panel in response to input image data during frame periods, and generates sensing data by sensing the plurality of pixels, each frame period comprises an active period and a vertical blank period, wherein the panel driver randomly senses one of the first to $n^{th}$ pixel rows in each of a plurality of sensing frame periods when the input image data correspond to a low grayscale image to prevent a horizontal line from being recognized due to a sensing in the low grayscale image, wherein the sensing frame periods are repeated with consecutive non-sensing frame periods provided therebetween, wherein, in the non-sensing frame periods, no sensing of the pixels is performed during the vertical blank period, and wherein, in the sensing frame periods, sensing of the pixels is performed during the vertical blank period.

* * * * *